R. E. HELLMUND.
CONTROL SYSTEM FOR SINGLE PHASE MOTORS.
APPLICATION FILED MAY 27, 1916.

1,277,416.

Patented Sept. 3, 1918.
2 SHEETS—SHEET 1.

WITNESSES:
Fred. A. Lind.
D. C. Davis.

INVENTOR
Rudolf E. Hellmund
BY
ATTORNEY

R. E. HELLMUND.
CONTROL SYSTEM FOR SINGLE PHASE MOTORS.
APPLICATION FILED MAY 27, 1916.

1,277,416.

Patented Sept. 3, 1918.
2 SHEETS—SHEET 2.

WITNESSES:
Fred. A. Lind.
D. C. Davis

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR SINGLE-PHASE MOTORS.

1,277,416.

Specification of Letters Patent.  Patented Sept. 3, 1918.

Application filed May 27, 1916. Serial No. 100,253.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Control Systems for Single-Phase Motors, of which the following is a specification.

My invention relates to systems of control for alternating-current motors of the single-phase, commutator type, and it has for its object to provide means whereby motors of the character designated may be started and accelerated in a smooth and gradual manner, with the switching of but small currents and with freedom from commutation difficulties.

Figures 1, 2:
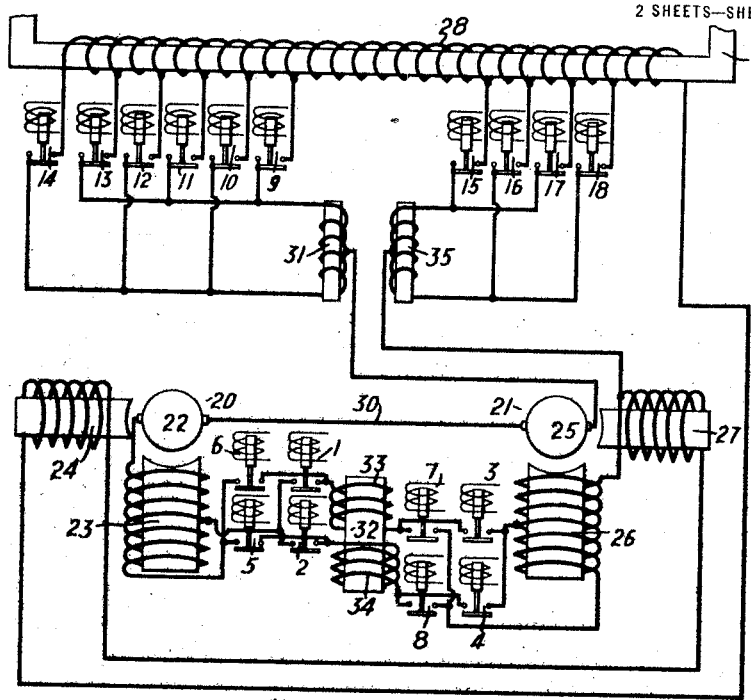
Figure 3:
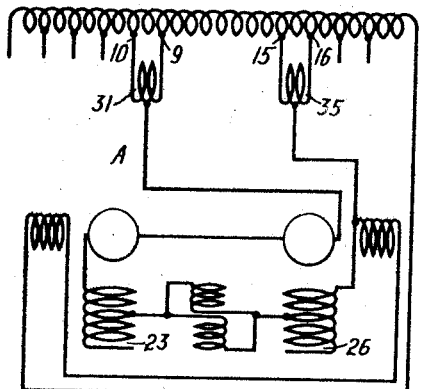

Figure 1 of the accompanying drawing is a diagrammatic view of a pair of motors of the single-phase, cross field, commutator type, together with their attendant supply and control circuits, arranged in accordance with my invention; Fig. 2 is a sequence chart illustrating the order of switch operation in the system of Fig. 1, when operating in accordance with my invention; and Figs. 3 to 7, inclusive, are simplified diagrammatic views illustrating the development in the connections of the system of Fig. 1 when the switches thereof are operated and in accordance with Fig. 2.

In the acceleration of alternating-current motors, particularly of the large sizes employed for locomotive propulsion and like uses, the problem of switching the large currents required becomes difficult. In order to reduce the total amount of current to be switched, it is a common practice to operate the motors in series with each other so that the total current to be controlled is merely that of one motor. By my invention, I not only reduce the total amount of current to be switched in this manner, but, in addition, I control the voltage impressed upon a pair of motors by shifting a current tap to said motors through a preventive device to which two control switches are at all times supplying current, except at the instant of transition, whereby the load current is at all times divided between two load switches and the switching difficulties are thus reduced.

It has been proposed, as indicated in my prior applications, Serial Nos. 54,540, 63,973 and 63,974, filed Oct. 7, 1915, Nov. 29, 1915, and Nov. 29, 1915, respectively, of which Serial No. 63,974 issued Jan. 1, 1918, as Patent No. 1,251,660, to connect two single-phase alternating-current, commutator motors in series relation with each other, with their main field windings in immediate proximity in said series circuit, and to connect together intermediate points in said main field windings during certain portions of the accelerating process in order to weaken the main field excitation and thus reduce the transformer action on the short circuited armature coils undergoing commutation, thus reducing sparking. By the present invention, I improve the commutation in a similar manner, but said intermediate tap connection between the main field windings is made through a two-part preventive device, whereby the transition from weak main field to strong main field may be made gradually, with the switching, at any given time, of but one-half the motor current, and, furthermore, without at any time opening said series circuit or short circuiting any main field turns.

Referring to the accompanying drawing for a more detailed understanding of my invention, I show alternating-current motors of the single-phase, cross-field, commutator type at 20 and 21, respectively. The motor 20 is provided with an armature 22, a main field winding 23 and a cross field winding 24 and, in like manner, the motor 21 is provided with an armature 25, a main field winding 26 and a cross field winding 27. Energy for driving the motors 20 and 21 is derived from any suitable source, such, for example, as the secondary winding 28 of a transformer 29. While I have shown the transformer 29 as of the double-winding type, it may, if desired, be an auto-transformer having its terminals connected to a trolley and to the ground, respectively, as is customary in railway practice.

The two armatures 22 and 25 are connected directly together by a conductor 30, and the remaining brush of the armature 25 may be connected to any one of a plurality of taps in the supply winding 28 by means of suitable switches 9 to 14, inclusive, and a preventive device 31 of the inductive type. The switches 9 to 14, inclusive, are shown as of the electromagnetically operated type but, obviously, I may substitute switches of the pneumatically operated or any other suitable type.

The left hand brush of the motor 22 is connected through the main field winding 23 and a group of switches 1 to 8, inclusive, together with a preventive device 32 having two inductively related windings 33 and 34, to the main field winding 26, from whence connection is made to the inner terminal of the cross field winding 27. From this point, a circuit may be completed to a number of taps in the supply winding 28 through suitable switches 15 to 18, inclusive, and a preventive device 35 for the establishment of the well known doubly-fed connection, and a circuit is completed through the cross-field windings 27 and 24 to the right hand terminal of the supply winding 28, as indicated.

Both windings 33 and 34 of the preventive device 32 may be connected between the mid point of the main field windings 23 and 24 by the closure of the switches 1, 2, 3 and 4 and, in like manner, both of said preventive windings may be connected between the outer terminals of the main field windings 23 and 26 by the closure of the switches 5, 6, 7 and 8. By the suitable operation of said switches, as is hereinafter more specifically pointed out, said preventive windings may be transferred from one point of main field connection to the other at different times, thus providing a gradual transition in the main series connections.

The cross field windings 24 and 27 are preferably provided with substantially twice the number of turns that are contained in the armature windings, whereby the cross field current is maintained at substantially one-half the armature current, and, in various other ways, the motors 20 and 21 conform to the usual practice for single-phase, doubly-fed commutator motors.

Having thus described a system embodying my invention, the operation is as follows. At the outset, the switches 1 to 4, inclusive, 9, 10, 15 and 16 are closed, establishing the circuit shown in Fig. 3. The two motors are connected in series with each other, with a minimum total applied voltage and with a maximum cross field applied voltage, although, if desired, the motors may be started as series motors of the customary type or they may be started in accordance with the repulsion or the reversed doubly-fed system of connections, as explained in detail in an article by J. V. Dobson and myself, entitled single phase commutator motors and appearing on page 112 of the "*Electric Journal*" for March 1916.

With the system of connections shown, the armature current flowing between the outer armature terminal and the source is divided by the preventive device 31 to flow through the two switches 9 and 10 and, in like manner, the intermediate tap current is split by the preventive device 35 to flow to the source through the connections 15 and 16. The mid points of the two main field windings 22 and 26 are connected together through the preventive windings 33 and 34 which are arranged in parallel relation with each other, and, thus, the main field excitation is maintained at a minimum, as is desirable for good commutation. The windings 33 and 34 are wound in opposition, as is usual with balancing coils, whereby the load current is equally divided between the switches.

Figure 4:
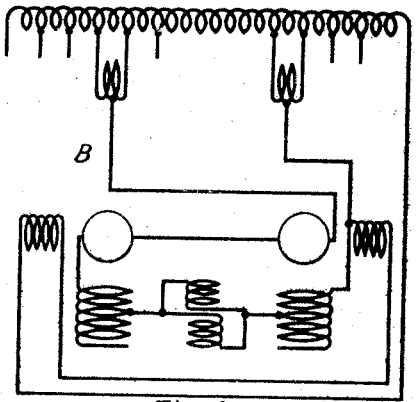
Figure 5:
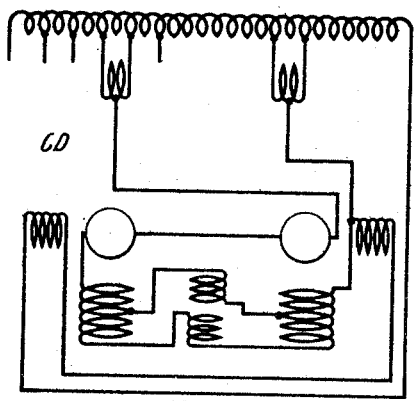
Figure 6:
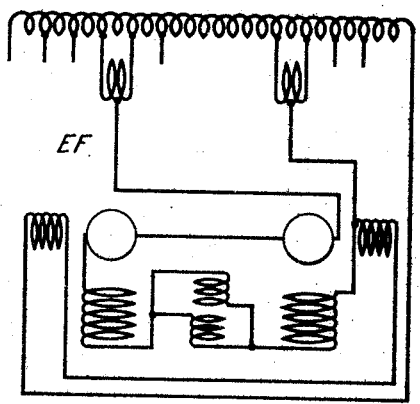
Figure 7:
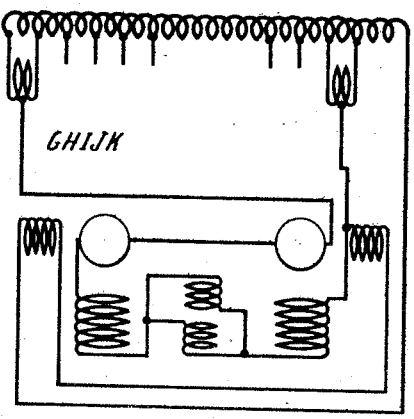

The switch 11 is next closed and the switch 9 is opened, as indicated in Fig. 4, raising the voltage on the outer armature tap and still maintaining the condition that but one-half the armature current flows through any one switch. In the accelerating positions C and D (Fig. 2), the switches 1 and 3 are opened and the switches 5 and 8 are closed, producing the connections shown in Fig. 5 wherein the preventive winding 34 is connected between the outer main field terminals, and the preventive winding 33 remains connected between the mid points of the main field windings, as hitherto. In the accelerating positions E and F, the switches 2 and 4 are opened and the switches 6 and 7 are closed, transferring the preventive winding 33 to a circuit connecting the outer main field terminals and still further increasing the main field excitation. For the remaining accelerating positions, the armature impressed voltage is gradually raised by alternately raising the voltage applied to the outer cross field terminal and reducing the voltage applied to the doubly-fed tap, the latter operation necessarily reducing the voltage applied to the cross field windings. It is frequently desirable to employ more steps for increasing the voltage applied to the outer armature tap than for varying the voltage applied to the intermediate tap, and, under these conditions, I intermingle the intermediate adjusting steps among the outer armature tap steps, as, for example, by performing one of the former for each two of the latter. At the conclusion of the accelerating process, the connections shown in Fig. 7 are established, the armature and main field windings receiving a maximum impressed voltage and the cross field winding receiving a minimum impressed voltage, as is desirable for satisfactory operation with many types of single-phase motors, as now designed.

While I have shown and described my invention in its preferred form, it will be obvious to those skilled in the art that it is susceptible of various minor changes and modifications without departing from the spirit thereof and I desire, therefore, that only such limitations shall be placed thereupon as are imposed by the prior art or set forth in the appended claims.

I claim as my invention:

1. The combination with a source of alternating current, of a single-phase, alternating-current motor of the cross-field, commutator type arranged for doubly-fed operation, means for reducing the number of effective field turns in starting, and means for accelerating the said motor by shifting the outer armature lead.

2. The combination with a source of alternating current, of two alternating-current motors of the commutator type connected in series relation thereto, the main field windings of said motors being immediately adjacent to each other in said series circuit, an inductive device comprising at least two distinct windings, and switching means for connecting both of said windings between an intermediate point in one of said main field windings and an intermediate point in the other of said field windings.

3. The combination with a source of alternating current, of two alternating-current motors of the commutator type connected in series relation thereto, the main field windings of said motors being immediately adjacent to each other in said series circuit, an inductive device comprising at least two distinct windings, and switching means for connecting both of said windings between an intermediate point in one of said main field windings and an intermediate point in the other of said field windings or for connecting said inductive windings between different points in said main field windings.

4. The combination with a source of alternating current, of two alternating-current motors of the commutator type connected in series relation thereto, the main field windings of said motors being immediately adjacent to each other in said series circuit, an inductive device comprising at least two distinct windings, and switching means for connecting both of said windings between an intermediate point in one of said main field windings and an intermediate point in the other of said field windings, or for connecting one of said windings between said two intermediate main field winding points and for connecting the other of said windings between the outer terminal of one main field winding and the outer terminal of the other main field winding.

5. The combination with a source of alternating current, of two alternating-current motors of the commutator type connected in series relation thereto, the main field windings of said motors being immediately adjacent to each other in said series circuit, an inductive device comprising at least two distinct windings, and switching means for connecting both of said windings between an intermediate point in one of said main field windings and an intermediate point in the other of said field windings, or for connecting both of said windings between the outer terminal of one main field winding and the outer terminal of the other main field windings, said switching means being so arranged that one of said windings is transferred subsequently to the other.

6. The combination with a source of alternating current, of two alternating-current motors of the commutator type connected in series relation thereto, the main field windings of said motors being immediately adjacent to each other in said series circuit, means embodying a plurality of current paths for connecting an intermediate point in one main field winding to an intermediate point in the other main field winding, and means for non-simultaneously transferring said current paths to connect the terminals of said main field windings.

In testimony whereof I have hereunto subscribed my name this 9th day of May, 1916.

RUDOLF E. HELLMUND.

Copies of this patent may be obtained for five cents each, by addressing the "Commissioner of Patents, Washington, D. C."